(12) United States Patent
Lindén et al.

(10) Patent No.: US 8,220,163 B2
(45) Date of Patent: Jul. 17, 2012

(54) PRUNING SHEARS

(75) Inventors: Olavi Lindén, Billnäs (FI); Markus Paloheimo, Karjaa (FI)

(73) Assignee: Fiskars Brands Finlay Oy AB, Billnas (FI)

( * ) Notice: Subject to any disclaimer, the term of this patent is extended or adjusted under 35 U.S.C. 154(b) by 249 days.

(21) Appl. No.: 12/600,819

(22) PCT Filed: May 20, 2008

(86) PCT No.: PCT/FI2008/050282
§ 371 (c)(1),
(2), (4) Date: Apr. 8, 2010

(87) PCT Pub. No.: WO2008/142203
PCT Pub. Date: Nov. 27, 2008

(65) Prior Publication Data
US 2010/0199502 A1    Aug. 12, 2010

(30) Foreign Application Priority Data

May 22, 2007   (FI) ..................... 20075368

(51) Int. Cl.
*B26B 17/02*   (2006.01)
*B26B 13/26*   (2006.01)
*A01G 3/025*   (2006.01)
(52) U.S. Cl. .............. 30/249; 30/245; 30/246; 30/296.1
(58) Field of Classification Search ............... 30/188, 30/245, 246, 249, 296.1
See application file for complete search history.

(56) References Cited

U.S. PATENT DOCUMENTS

| 107,577 A | 9/1870 | Will |
| 157,610 A | 12/1874 | King |
| 476,459 A | 6/1892 | Hamann et al. |
| 573,548 A | 12/1896 | Sours |
| 640,257 A | 1/1900 | Baer |
| 823,367 A | 6/1906 | Ryan |
| 863,111 A | 8/1907 | Smohl |
| 1,066,675 A | 7/1913 | Stowell |
| 1,168,125 A | 1/1916 | Stowell |

(Continued)

FOREIGN PATENT DOCUMENTS

EP   0 747 181   12/1996
(Continued)

OTHER PUBLICATIONS

European Search Report for 09167978.7; dated Feb. 23, 2011, 6 pages.

(Continued)

*Primary Examiner* — Hwei C Payer
(74) *Attorney, Agent, or Firm* — Foley & Lardner LLP

(57) ABSTRACT

The invention relates to pruning shears comprising a cutting head (12) with a spring-loaded blade (18) acting in cooperation with a counter blade (20), a drive mechanism (16) connected to the cutting head (12), and an elongated handle (14) connected to the drive mechanism (16). The drive mechanism comprises a first and a second counterpart (32, 34), optionally rotating with respect to one another about an axis (36), allowing the cutting head (12) to be adjusted with respect to the elongated handle (14), and an upper line arrangement allowing the blade (18) to be turned about a hinge point (19) and the cutting head to be adjusted in such a manner that the blade (18) does not rotate about the hinge point (19).

19 Claims, 5 Drawing Sheets

U.S. PATENT DOCUMENTS

| | | | | |
|---|---|---|---|---|
| 1,429,792 | A | 9/1922 | Stiriss | |
| 1,455,297 | A | 5/1923 | Lyons et al. | |
| 1,502,191 | A | 7/1924 | Helwig | |
| 1,507,225 | A | 9/1924 | Barrett | |
| 1,520,529 | A | 12/1924 | Cagle | |
| 1,533,039 | A | 4/1925 | Shirk | |
| 1,689,648 | A | 10/1928 | Voleske | |
| 1,760,627 | A | 5/1930 | Bernard | |
| 1,771,031 | A | 7/1930 | Court | |
| 1,897,532 | A | 2/1933 | Pilcher | |
| 2,516,946 | A | 8/1950 | Barone | |
| 2,520,908 | A | 9/1950 | Carson et al. | |
| 2,528,816 | A | 11/1950 | Boyer | |
| 2,557,506 | A | 6/1951 | Kovacevich | |
| 2,674,796 | A | 4/1954 | Herold | |
| 2,744,322 | A * | 5/1956 | Gustafson | 30/249 |
| 2,769,237 | A | 11/1956 | Oxhandler | |
| 3,360,858 | A * | 1/1968 | Cowley | 30/249 |
| 3,594,903 | A * | 7/1971 | Schluchter | 30/39 |
| 3,760,500 | A | 9/1973 | Eads et al. | |
| 4,031,621 | A | 6/1977 | Arlett | |
| 4,046,148 | A | 9/1977 | Meador | |
| 4,094,064 | A | 6/1978 | Nishikawa et al. | |
| 4,130,938 | A | 12/1978 | Uhlmann | |
| 4,224,739 | A | 9/1980 | Emblidge | |
| 4,528,707 | A | 7/1985 | Aida | |
| 4,599,795 | A | 7/1986 | Yokoyama | |
| 4,677,748 | A | 7/1987 | Kobayashi | |
| D301,537 | S | 6/1989 | Pittaway | |
| D301,538 | S | 6/1989 | Pittaway | |
| D305,090 | S | 12/1989 | Collins et al. | |
| 4,947,553 | A | 8/1990 | Bendickson et al. | |
| 4,964,216 | A | 10/1990 | Gosselin | |
| 5,020,222 | A | 6/1991 | Gosselin et al. | |
| 5,079,801 | A | 1/1992 | Peterson | |
| 5,084,975 | A | 2/1992 | Melter | |
| D336,222 | S | 6/1993 | Wensley et al. | |
| D336,412 | S | 6/1993 | Wensley et al. | |
| D336,835 | S | 6/1993 | Lutzke | |
| 5,241,752 | A | 9/1993 | Lutzke et al. | |
| 5,255,438 | A | 10/1993 | Morgan | |
| D342,652 | S | 12/1993 | Wensley et al. | |
| 5,267,400 | A | 12/1993 | Danube et al. | |
| D343,773 | S | 2/1994 | Lutzke | |
| D347,771 | S | 6/1994 | Lutzke | |
| 5,317,806 | A * | 6/1994 | Held et al. | 30/249 |
| 5,367,774 | A | 11/1994 | Labarre et al. | |
| 5,426,857 | A | 6/1995 | Lindén | |
| 5,469,625 | A | 11/1995 | Melter et al. | |
| 5,570,510 | A | 11/1996 | Lindén | |
| 5,592,743 | A | 1/1997 | Labarre et al. | |
| 5,689,888 | A | 11/1997 | Lindén | |
| 5,697,159 | A | 12/1997 | Lindén | |
| 5,761,815 | A | 6/1998 | Lin | |
| 5,933,965 | A | 8/1999 | Lindén et al. | |
| 5,950,315 | A | 9/1999 | Lindén | |
| 5,974,670 | A | 11/1999 | Hsieh | |
| 6,101,725 | A | 8/2000 | Lindén | |
| 6,105,257 | A | 8/2000 | Rutkowski et al. | |
| 6,161,291 | A | 12/2000 | DiMatteo et al. | |
| 6,199,284 | B1 | 3/2001 | Nilsson et al. | |
| 6,202,310 | B1 | 3/2001 | Lindén | |
| 6,272,755 | B1 | 8/2001 | Mittlesteadt et al. | |
| 6,345,446 | B1 | 2/2002 | Huang | |
| 6,418,626 | B1 | 7/2002 | Jang | |
| 6,446,343 | B1 * | 9/2002 | Huang | 30/249 |
| 6,493,943 | B1 | 12/2002 | Lindén | |
| 6,513,248 | B2 | 2/2003 | Linden et al. | |
| 6,526,664 | B2 | 3/2003 | Cech | |
| 6,694,621 | B1 | 2/2004 | Boley et al. | |
| 6,711,820 | B2 | 3/2004 | Chen | |
| 6,748,663 | B2 | 6/2004 | Lindén | |
| 6,785,969 | B2 | 9/2004 | Wang | |
| 6,789,324 | B2 | 9/2004 | Lindèn et al. | |
| 6,829,828 | B1 | 12/2004 | Cech et al. | |
| 6,829,829 | B1 | 12/2004 | Huang | |
| D501,379 | S | 2/2005 | Lipscomb et al. | |
| D503,595 | S | 4/2005 | Lipscomb et al. | |
| 6,935,031 | B1 | 8/2005 | Huang | |
| 6,938,346 | B1 | 9/2005 | Huang | |
| 7,080,455 | B1 | 7/2006 | Ronan et al. | |
| 7,127,819 | B1 | 10/2006 | Huang | |
| D576,011 | S | 9/2008 | Lipscomb et al. | |
| 7,530,172 | B1 | 5/2009 | Wu | |
| 7,681,318 | B2 | 3/2010 | Hsieh | |
| D621,234 | S | 8/2010 | Goetz et al. | |
| 8,046,925 | B2 * | 11/2011 | Wu | 30/249 |
| 8,069,573 | B2 * | 12/2011 | Wu | 30/249 |
| 8,079,151 | B2 * | 12/2011 | Chen | 30/296.1 |
| 2001/0005941 | A1 | 7/2001 | DiMatteo et al. | |
| 2002/0046466 | A1 | 4/2002 | Deville | |
| 2002/0066188 | A1 | 6/2002 | Wu | |
| 2003/0014868 | A1 | 1/2003 | Cech et al. | |
| 2003/0136008 | A1 | 7/2003 | Lin | |
| 2005/0172499 | A1 | 8/2005 | Huang | |
| 2006/0156554 | A1 | 7/2006 | Lin | |
| 2006/0277764 | A1 | 12/2006 | Hsien | |
| 2008/0052916 | A1 | 3/2008 | Lin | |
| 2008/0155835 | A1 | 7/2008 | Lin | |
| 2008/0276464 | A1 | 11/2008 | Hatch | |
| 2008/0282549 | A1 | 11/2008 | Lin | |
| 2009/0038162 | A1 * | 2/2009 | Shan | 30/249 |
| 2009/0044412 | A1 | 2/2009 | Hsieh | |
| 2010/0043237 | A1 | 2/2010 | Linden et al. | |
| 2010/0043238 | A1 | 2/2010 | Linden et al. | |
| 2010/0162575 | A1 | 7/2010 | Lin | |
| 2010/0199502 | A1 | 8/2010 | Linden et al. | |
| 2011/0107606 | A1 * | 5/2011 | Shan | 30/249 |
| 2011/0113635 | A1 * | 5/2011 | Lee et al. | 30/194 |
| 2011/0154668 | A1 | 6/2011 | Liu et al. | |
| 2011/0271532 | A1 * | 11/2011 | Wu | 30/249 |
| 2012/0047749 | A1 * | 3/2012 | Huang | 30/249 |

FOREIGN PATENT DOCUMENTS

| | | |
|---|---|---|
| EP | 1 153 713 | 11/2001 |
| EP | 1 166 620 | 1/2002 |
| EP | 1 625 784 B1 | 2/2006 |
| EP | 2 156 730 | 2/2010 |
| EP | 2 156 731 | 2/2010 |
| FR | 2 825 573 A3 | 12/2002 |
| GB | 605038 A | 7/1948 |
| GB | 1258471 A | 12/1997 |
| GB | 2 375 500 B | 3/2004 |
| GB | 2 468 665 | 9/2010 |
| JP | 08-331979 | 12/1996 |
| JP | 11-057243 | 3/1999 |
| JP | 2002-066168 | 3/2002 |
| WO | WO 2007/128879 A1 | 11/2007 |

OTHER PUBLICATIONS

U.S. Appl. No. 12/542,536, filed Aug. 17, 2009, Linden et al.
U.S. Appl. No. 12/542,517, filed Aug. 17, 2009, Linden et al.
U.S. Appl. No. 12/300,099, filed May 8, 2007, Linden et al.
PCT International Search Report and Written Opinion by the International Searching Authority based on International Application No. PCT/FI2008/050282, date of mailing of the International Search Report Sep. 10, 2008.
Search Report by the Finnish Patent Office for Finnish Application No. 20075368, dated Apr. 15, 2008.
Office Action by the Finnish Patent Office for Finnish Application No. 20075368, dated Apr. 16, 2008.

\* cited by examiner

PRUNING SHEARS

BACKGROUND OF THE INVENTION

The present invention relates generally to cutting tool techniques and particularly to pruning shears comprising a cutting head with a spring-loaded blade connected to a counter blade pivotally about a hinge point, the counter blade acting in cooperation with the blade for cutting a workpiece received in a jaw provided by the counter blade, a drive mechanism connected to the cutting head, an elongated handle connected to the drive mechanism, which comprises a first and a second counterpart, optionally rotating with respect to one another about an axis, allowing the cutting head to be adjusted with respect to the elongated handle, whereby the first counterpart is connected to the elongated handle and the second counterpart is connected to the cutting head, a first wheel rotating about an axis, a drive line arranged to rotate the first wheel when the drive line is drawn.

BACKGROUND OF THE INVENTION

Pruning shears according to the starting point for the pruning shears of the present invention and thus the closest related art background are disclosed in U.S. Pat. Nos. 5,950,315 and 6,748,663. Since so many structural features of the pruning shears according to the present invention correspond to the pruning shears mentioned in the above-mentioned patents, said patent is incorporated in this application by reference.

In pruning shears known from said patents, a spring-loaded pivoted blade, which forms a cutting jaw with a counter blade having a fixed position, is driven by a drive mechanism, which transmits power to the moving cutting blade by means of a chain. In the drive mechanism the chain is fastened to a chain wheel associated with a drive wheel coupled to a drive line. Some of the drive line is wound on the drive wheel. The chain wheel and the drive wheel are arranged to rotate together about a common axis, and when the drive line is drawn, it makes both the drive wheel and the chain wheel connected thereto rotate about their common axis. The chain thus applies the drawing to the spring-loaded blade. When the drawing is stopped, the blade spring restores the drive line to its original position. Such a drive mechanism is simple and reliable.

There is, however, a problem related to the drive mechanism described above. In the pruning shears described in said U.S. Pat. No. 5,950,315, the cutting head is pivoted with respect to the operating handle of the pruning shears in such a manner that the angular position of the cutting head may be adjusted relative to the handle. As a result of this adjustment, the drive line is either wound on or off the drive wheel. If the drive line is further wound on the drive wheel, it also goes around the chain wheel, which, for its part, applies the drawing along the chain to the moving blade by changing the width of the cutting jaw. To compensate for or cancel out this change, the fastening between one end of the drive line and the handle of the pruning shears must be released and more of the drive line is freed thereby to restore the maximum size of the cutting jaw. Even though the length adjustment of the drive line were simple with respect to the knot by which the drive line is fastened to the handle, the length adjustment of the drive line always causes some extra work.

U.S. Pat. No. 6,748,663 solves this disadvantage by a complex drive mechanism and a drive line arrangement enabling the adjustment of the angular position of the cutting head relative to the elongated handle without changing the width of the cutting jaw during the adjustment. Such a solution is, however, complex, expensive to manufacture, and the use is unreliable due to its complexity. It is also very difficult for a user to re-assemble the drive mechanism of the patent, if it must be opened and dismantled because of maintenance or other repair work.

SUMMARY OF THE INVENTION

It is an object of the present invention to provide pruning shears so that the above disadvantages can be eliminated. The objects of the invention are achieved with a drive mechanism that comprises:

a second wheel which comprises a first guide surface and is rotatable about the axis together with the first wheel, a second guide surface provided in connection with the blade, a third guide surface provided at the first counterpart, an upper line arrangement comprising an upper line connected via the second guide surface between the first guide surface and the third guide surface in such a manner that the upper line is arranged to be wound on the first guide surface when the second wheel rotates about the axis to turn the blade about the hinge point, and to be wound accordingly on the first guide surface and off the third guide surface or to be wound accordingly off the first guide surface and on the third guide surface when the cutting head is adjusted relative to the elongated handle.

As stated above, the drive mechanism of the pruning shears according to the invention has two operating states, one of which is the operating state used when the pruning shears are in conventional use and the other is the operating state used when the angle of the cutting head is adjusted relative to the handle. Both operating situations require their own compensation for the length of the upper line in order for the drive mechanism to function as desired and to allow the position of the cutting head to be adjusted relative to the handle without having to adjust the length of the drive line to maintain the desired size of the cutting jaw. In other words, the present invention provides an arrangement, in which the length of the upper line in connection with the cutting blade changes when the pruning shears are used conventionally for cutting a workpiece and the length of the upper line does not change when the angle of the cutting head is adjusted relative to the handle. The changing of the upper line length makes the cutting blade turn about the hinge point to produce cutting motion of the cutting blade. Accordingly, as a result of the adjustment of the cutting head relative to the handle, an equal amount of upper line is wound off the first guide surface and on the third guide surface, or vice versa, whereby the length of the upper line does not change and the blade stays in its place. In other words, the pruning shears have two or more operating states, between which the pruning shears or, more specifically the cutting head, may be adjusted. Thus, the angle of the cutting head relative to the handle may be adjusted between these operating states in such a manner that the length of the upper line does not change when the angle of the cutting head is adjusted relative to the handle.

BRIEF DESCRIPTION OF THE FIGURES

In the following, an embodiment of the invention is described by way of example in greater detail and with reference to the attached drawing, in which like structural parts are provided with like reference numerals. In the figures

DETAILED DESCRIPTION OF THE INVENTION

The present invention relates to cutting tools, such as pruning shears. However, although the invention is here often called pruning shears, a person skilled in the art understands that the mechanism and operating principles described herein may be used generally for various other cutting tools.

Figure 1:
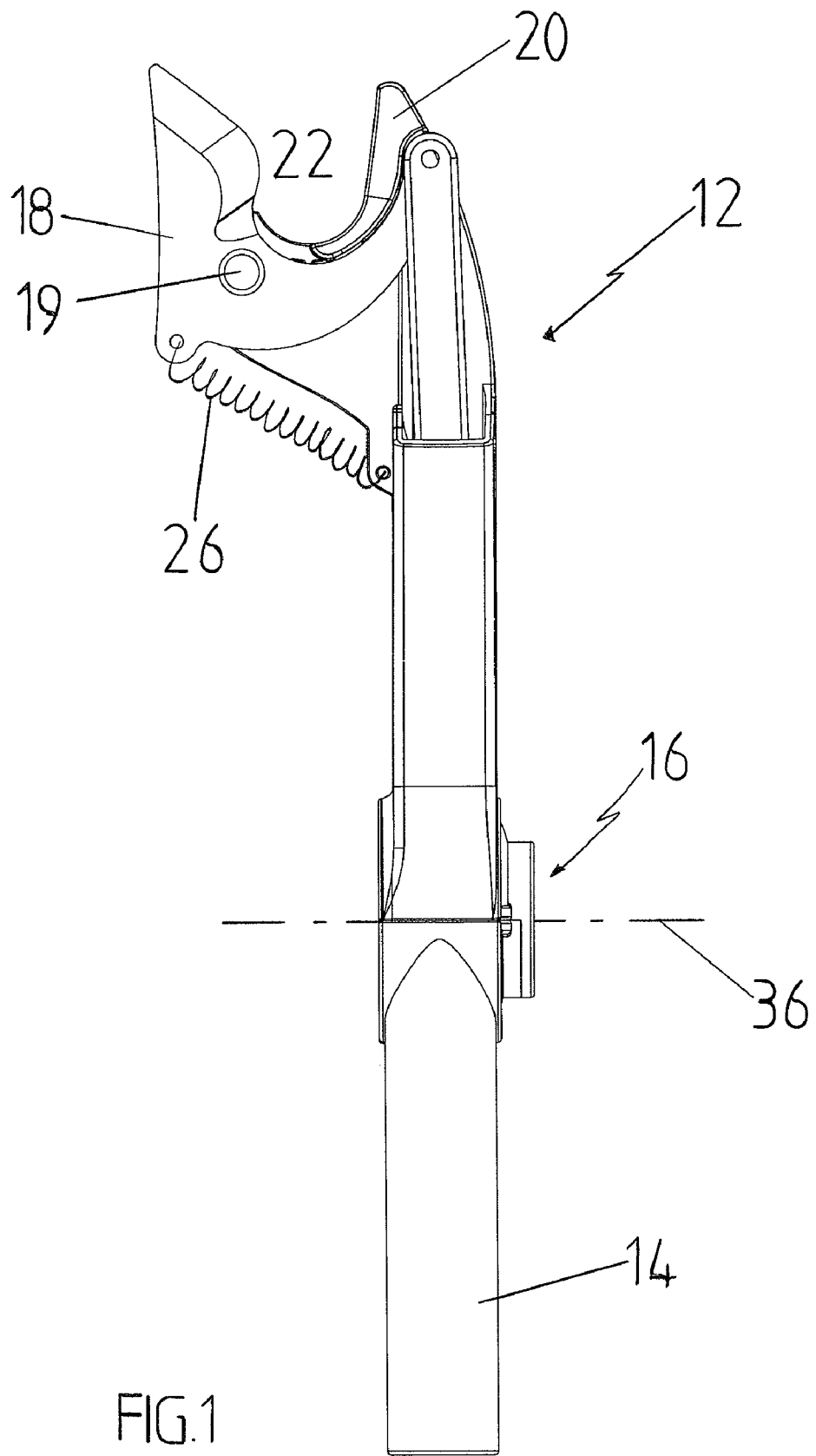
FIG. 1 shows an embodiment of pruning shears according to the present invention.

With reference to FIG. 1, an embodiment of pruning shears comprise a cutting head 12 for lopping, trimming and pruning, an elongated handle 14 (of which only a part is shown) and a drive mechanism 16 set between the cutting head 12 and the handle 14. The cutting head 12 comprises a blade 18, which is rotatable about a hinge point 19 and in co-operation with a counter blade 20, forming a jaw 22 intended to receive a workpiece to be cut by the blade 18. A spring 26 (principle view) tensions the blade 18 in an open position with respect to the counter blade 20.

Since a particular object of the present invention is the drive mechanism 16, the operation of the drive mechanism will next be described more closely, whereas those structural parts that are associated with the cutting head and its operation or the elongated handle and operating handles thereon as well as the fastening of a drive line to these operating handles will not be described. These parts may have a structure and operation similar to what is described in the prior art.

Figure 2:
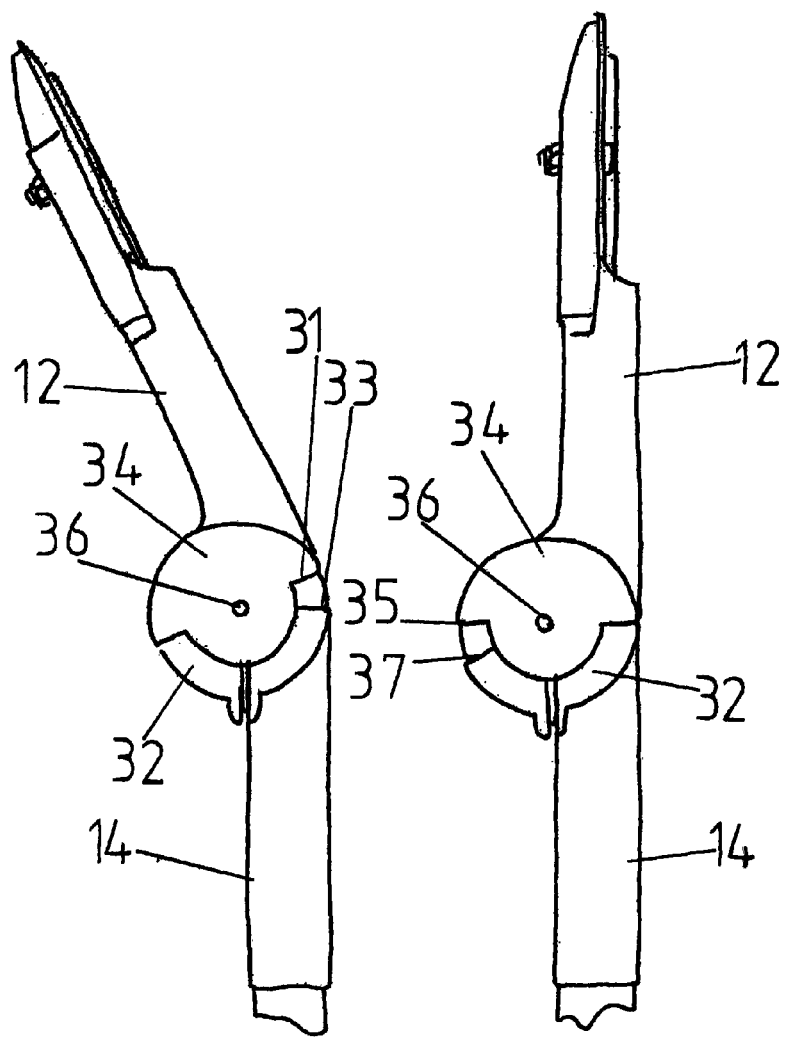
FIGS. 2A and 2B show a principle view how the pruning shears of FIG. 1 are adjusted relative to the handle.

According to the invention, the drive mechanism 16 comprises a first and a second counterpart 32 and 34, which may rotate with respect to one another about an axis 36, as shown in FIGS. 2A and 2B. The first counterpart 32 is connected to the elongated handle 14 and the second counterpart 34 is connected to the cutting head 12. The axis 36 may be formed of a bolt or a similar fastening means, by which the counterparts 32 and 34 may be tightened against one another. The counterparts 32 and 34 are further provided in such a manner that they limit the rotation of the counterparts 32 and 34 with respect to one another between specific extreme positions. This may be achieved, for example, by providing the counterparts 32 and 34 with sliding surfaces and stoppers, which together define the extreme positions of the cutting head 12 and the handle part 14 with respect to one another. In FIG. 2A, the pruning shears 10 are shown in a straight position, in which the cutting head 12 extends as a straight extension for the handle 14. In FIG. 2B, the pruning shears 10 are arranged in such a manner that the cutting head 12 extends at an angle to the handle 14. In other words, the position of the cutting head 12 with respect to the handle 14 is adjustable by turning the cutting head 12 relative to the handle 14 about the axis 36. In FIG. 2A, the corresponding counter surfaces 37 and 35 of the counterparts 32 and 34 are at a distance from one another and the counter surfaces 33 and 31 are engaged with one another, whereas in FIG. 2B the corresponding counter surfaces 33 and 31 of the counterparts 32 and 34 are at a distance from one another and the counter surfaces 37 and 35 are against one another. In other words, the counter surfaces 33 and 31 and 37 and 35 of the counterparts 32 and 34 define the extreme positions of the relative locations between the cutting head 12 and the handle around the axis 36. It is also to be noted that the extreme positions of the relative locations between the cutting head and the handle around the axis 36 can also be limited by other known ways by using limiting means or shapes limiting the relative rotation of the cutting head and the handle around the axis 36.

Figure 3:
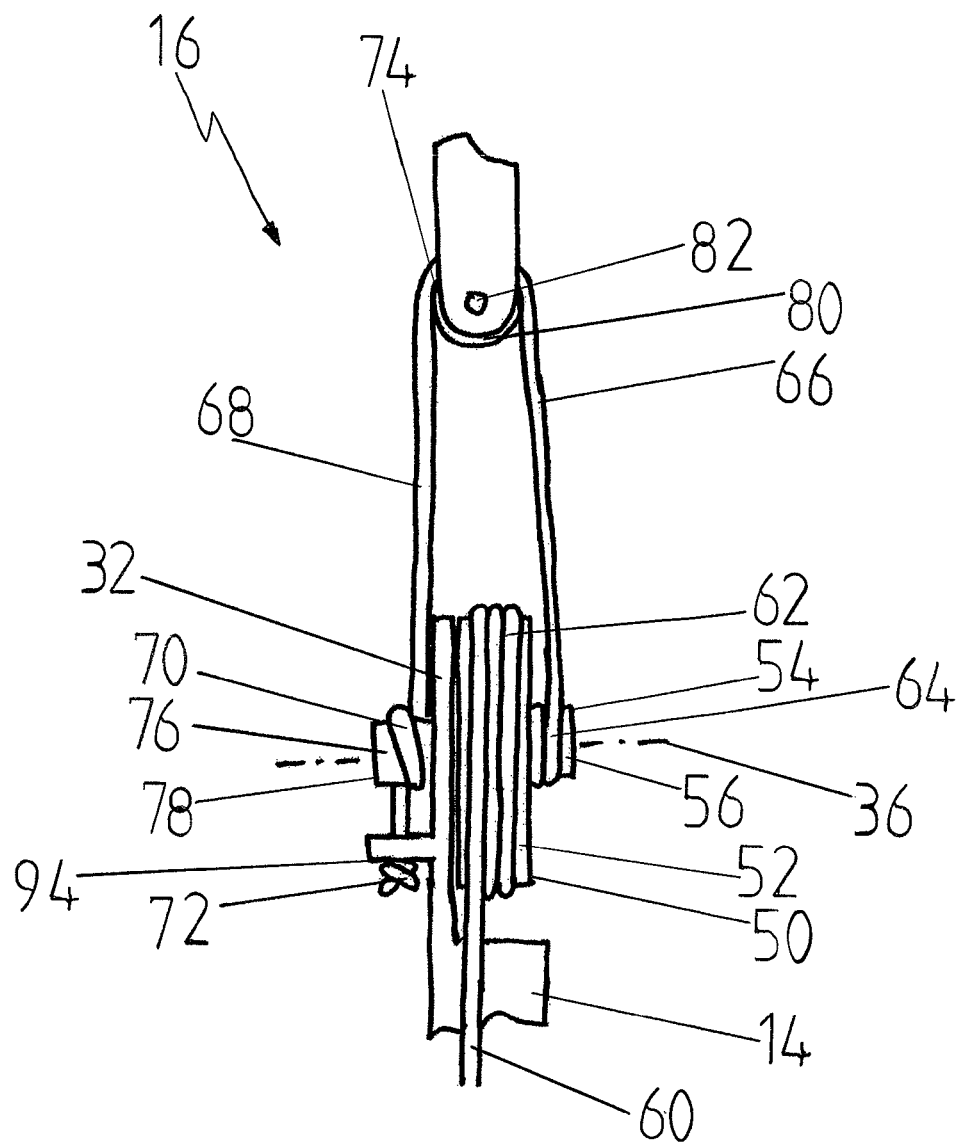
FIG. 3 shows a principle view of a drive mechanism according to the present invention.

FIG. 3 shows a principle view of a drive mechanism 16 according to the present invention. According to FIG. 3, the drive mechanism 16 comprises a first wheel 50, which may be rotated about the axis 36 with respect to the handle part 14 and the first counterpart 32 provided at the handle part 14. The first wheel 50 comprises on its outer circumference a guide surface, which is called a fourth guide surface 52 herein. A drive line 60 is connected to the first wheel 50 so that one or more drive line turns 62 are wound on the fourth guide surface 52. The first wheel 50 is also provided with a first fastening point, to which the drive line is fastened after the turns on the fourth guide surface 52. When the drive line 60 is drawn, the first wheel 50 rotates about the axis 36. In the pruning shears, the first wheel 50 rotates against the spring load of the spring 26 at the cutting head 12 and, accordingly, the spring load rotates the first wheel 50 in a direction opposite to the drawing when the drive line 60 is no longer drawn, restoring the blade 18 to its original position, in which the jaw 22 is open. When the drive line 60 is drawn, some of the drive line 62 is thus wound off the guide surface 52 of the first wheel 50 and, accordingly, when the spring load turns the first wheel 50 in the opposite direction, some of the drive line 62 is wound back on the guide surface 52 of the first wheel 50.

According to FIG. 3, in connection with the first wheel 50 there is provided a second wheel 54 arranged to rotate together with the first wheel 50 about the axis 36. The second wheel 54 may be a fixed or integral part of the first wheel 50 or it may alternatively be a separate wheel fixed, locked or functionally connected to the first wheel 50 in some other way. What is essential is that the second wheel 54 is connected to the first wheel 50 in such a manner that it rotates together with the first wheel 50. The second wheel 54 comprises on its outer circumference a guide surface, which is here called a first guide surface 56. The diameter of the second wheel 54 is smaller, preferably significantly smaller, than that of the first wheel 50. Alternatively, the circumference of the first guide surface 56 is smaller than that of the fourth guide surface 52.

The drive mechanism 16 also comprises a second guide surface 74, which is at a distance from the second wheel 54, as shown in FIG. 3. In the solution of FIG. 3, the second guide surface 74 is provided on the outer surface of a wheel 80, which is here called a tackle pulley 80. The tackle pulley 80 is arranged to rotate about an axis 82. However, it is to be noted that it is also possible to replace the tackle pulley 80 by a fixed guide surface.

According to FIG. 3, the first counterpart 32 provided at or fixed to the handle 14 is provided with a third guide surface 76. In FIG. 3 this third guide surface 76 is on the outer circumference of the third wheel 78. The third wheel 78 is provided at the first counterpart 32 and is fixed relative to the first counterpart 32 and the handle 14. In the solution according to FIG. 3, the third wheel 78 or the third guide surface 76 is on the same axis 36 as the first wheel 50 and the second wheel 54, but it does not rotate with respect to the handle 14 and the first counterpart 32. The third guide surface 76 or the third wheel 78 may, however, also be provided at some other section of the first counterpart 32 or the handle 14.

Figure 4:
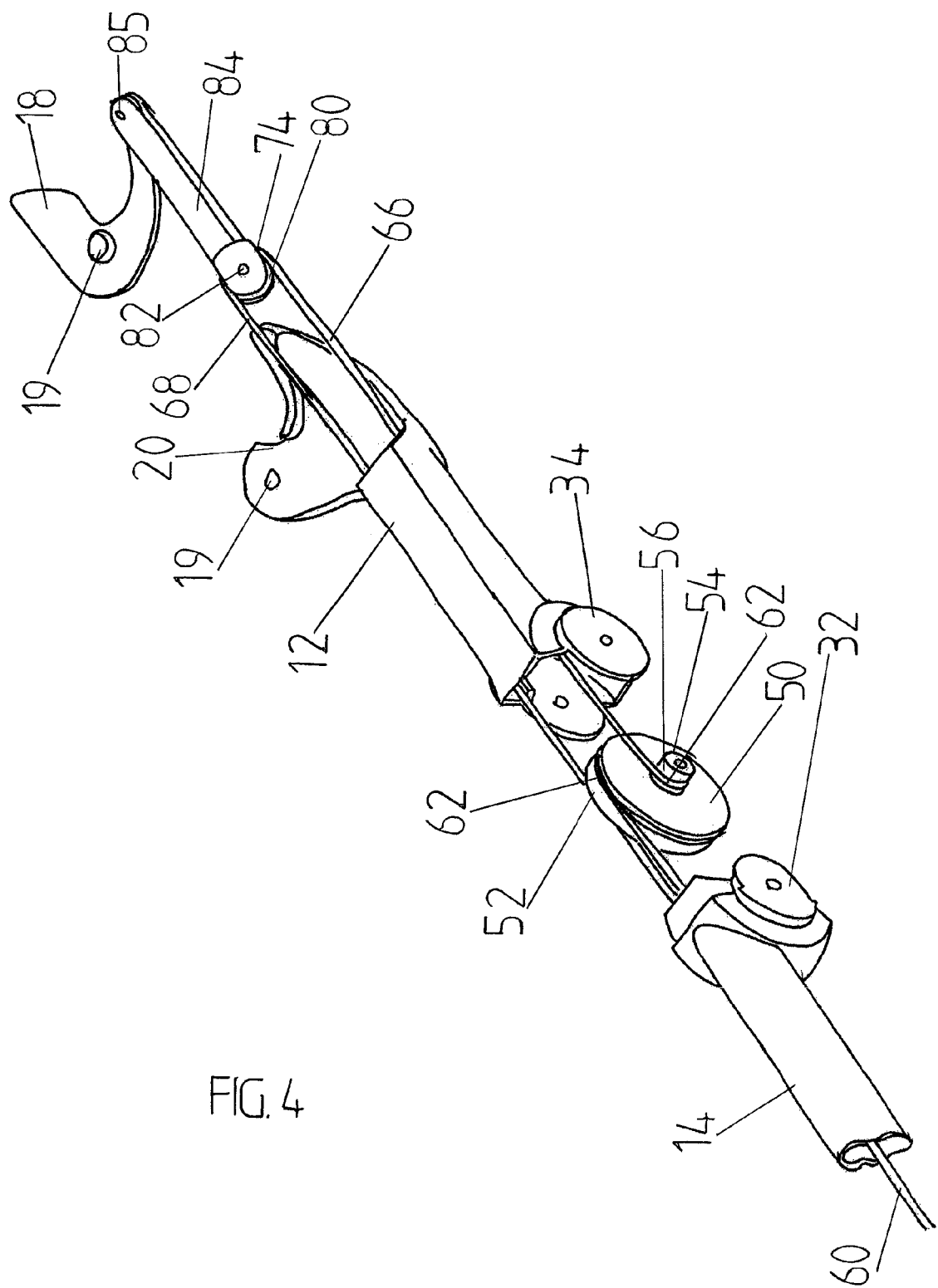
FIG. 4 shows an axonometric exploded view of pruning shears according to the present invention.
Figure 5:
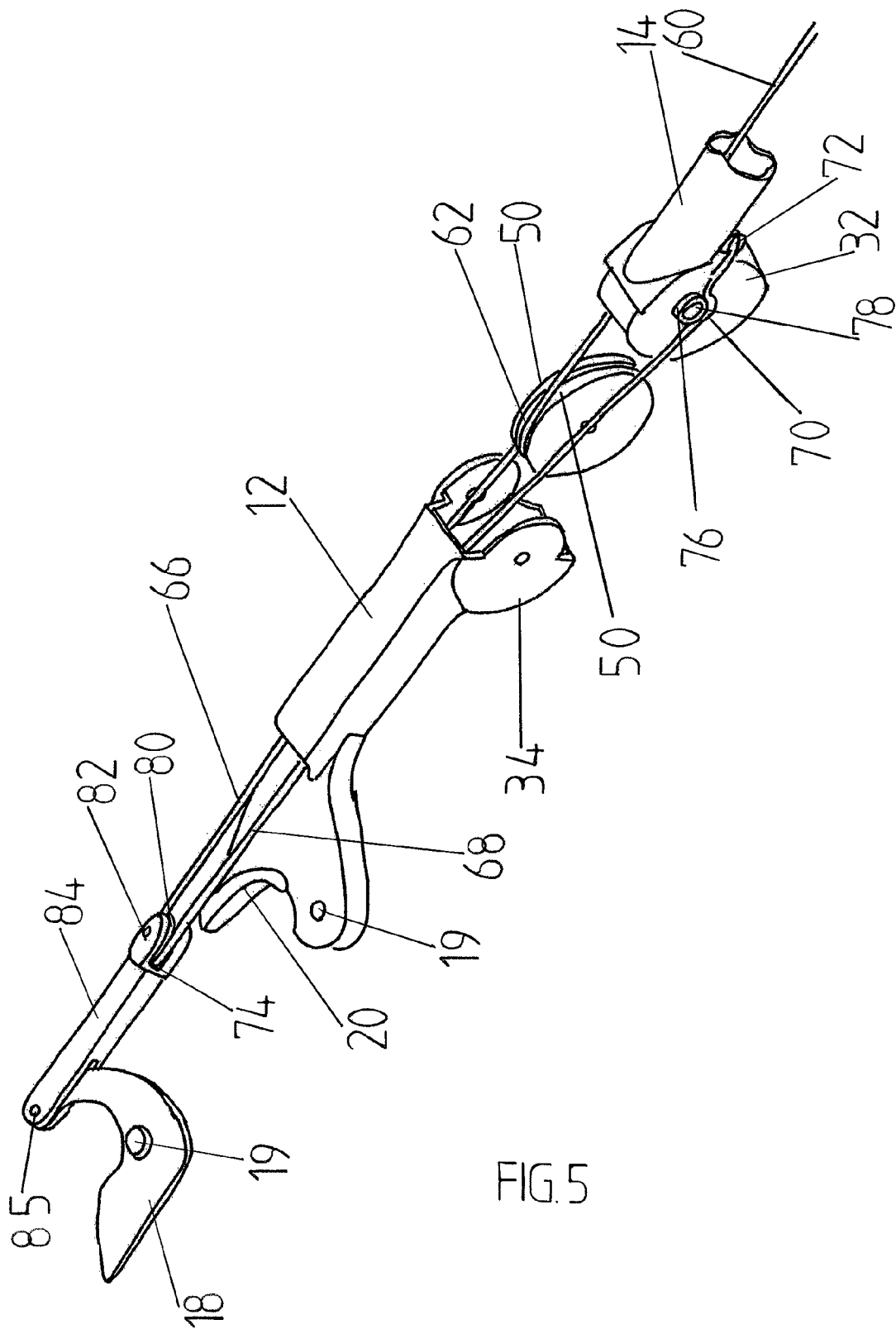
FIG. 5 shows another axonometric exploded view of the pruning shears of FIG. 4.

According to FIG. 3, the second wheel 54, the tackle pulley 80 and the third wheel 78 are connected to one another by a line, which is here called an upper line, the different parts of which are denoted in FIGS. 3, 4 and 5 by reference numerals 64, 66, 68, 70 and 72. The upper line is connected to the second wheel 54 and arranged to be wound along at least part of the turn, preferably one or more turns 64 of the upper line, on and off the first guide surface 56 of the second wheel 54 when the second wheel 54 rotates about the axis 36. The upper line is fastened with respect to the second wheel 54 and/or the first guide surface 56 at a second fastening point in such a manner that it cannot glide with respect to the second wheel 54 and the first guide surface 56. The second fastening point may be provided either at the first wheel 50 or the second wheel 54. From the first guide surface 56 the upper line 66 is taken around the second guide surface 74 and from there the upper line 68 is further taken to the third guide surface 76 and, along at least part of the turn, around the third guide surface 76. In accordance with FIG. 3, after the turn 70 of the upper line provided on the third guide surface 76, the end 72 of the upper line is fastened to the first counterpart 32 or the handle 14 at a fastening point, which is here called a third fastening point 94.

The drive mechanism 16 described above operates such that when the drive line 60 is drawn, the first wheel 50 starts to rotate about the axis 36, which, in turn, makes the second wheel connected thereto also rotate about the axis 36. When the drive line 60 is drawn, turns 62 of the drive line are wound off the guide surface 52 of the first wheel. The upper line 64 is connected to the second wheel 54 in such a manner that when the second wheel 54 rotates as a result of the drawing of the drive line 60, the upper line 64, 66 starts to wind on the first guide surface 56 of the second wheel 54. As the second end 72 of the upper line is fastened to the third fastening point 94, a force is applied to the second guide surface 74 and the tackle pulley 80, tending to pull the tackle pulley 80 towards the second wheel 54 and the axis 36. Consequently, the length of the upper line 66, 68 between the second wheel 54 and the third wheel 78 becomes shorter and the tackle pulley 80 moves towards the axis 36 while the upper line 66, 68 moves over the guide surface 74, whereby the tackle pulley 80 rotates about the axis 82. In pruning shears, the tackle pulley 80 moves towards the axis 36 against the spring load applied by the spring 26 to the blade 18, whereby the blade 18 turns about the hinge point 19 and performs cutting motion and closes the gap 22. When the drive line 60 is not drawn anymore, the spring load of the spring 26 draws the second guide surface 74 backwards, in which case the second wheel 54 rotates in the opposite direction and the upper line 66 is wound off the first guide surface 56 and, accordingly, the first wheel also rotates in the opposite direction, whereby the drive line 60 is wound back on the fourth guide surface 52 of the first wheel. The spring load of the spring 26 draws the blade 18 back and opens the jaw 22.

According to FIG. 3, the upper line 64, 66, 68, 70, 72 is wound on the first guide surface 56 of the second wheel 54 and the third guide surface 76 of the third wheel 78 in the opposite directions. This enables that when the second guide surface 74 or the tackle pulley 80 is rotated about the axis 82, which is the case when the cutting head 12 of the pruning shears is adjusted with respect to the handle 14, the upper line 64, 66, 68, 70, 72 is wound on the first guide surface 56 and off the third guide surface 76 or, accordingly, off the first guide surface 56 and on the third guide surface 76. Due to this, when the second guide surface 74 is moved about the axis 36, some of the upper line 64 is wound off the first guide surface 56 and on the third guide surface 76, or vice versa. When the second wheel 54 and the third wheel 78 are on the same axis 36 and the guide surfaces thereof have substantially similar proportions and shapes, an equal amount of upper line 64 is wound off the first guide surface 56 and on the third guide surface 76, or vice versa, whereby the distance between the second guide surface 74 or the tackle pulley 80 and the axis 36 does not change and the length of the upper line 64, 66, 68, 70 between the first guide surface 56 and the third guide surface 76 stays the same when the rotation about the axis 82 of the second guide surface 74 takes place at a specific distance. When the distance between the second guide surface 74 or the tackle pulley 80 and the axis 36 remains constant, the second wheel 54 and the first wheel 50 do not rotate with tackle pulley 80, which means that the blade 18 is not subjected to drawing, which would make the blade 18 move about the hinge point 19 and at least partly close the jaw 22. In other words, the adjustment of the cutting head 12 with respect to the handle 14 does not have an effect on the position of the blade 18. Preferably the second wheel 54 and the third wheel 78 have equal diameters.

It is further to be noted in the above solution that the drive line 60, 62 and the upper line 64, 66, 68, 70, 72 may be one and the same line. The drive line 60, 62 is taken via a fastening point from the first wheel 50 to the second wheel 54. The common fastening point may replace the above-mentioned first and second fastening points. A common fastening point may be provided either at the first or the second wheel 50, 54. It is also to be noted that the third guide surface 76 may also be provided at some other section of the counterpart 32 than the axis 36, or it may be located at the handle 14 but, in this case, the proportions and size of the third guide surface 76 must differ from those of the first guide surface 56 so that an equal amount of upper line 64, 66, 68, 70 is wound on the first guide surface 56 as is wound off the third guide surface 76, when the tackle pulley 80 is rotated about the axis 82 at a certain distance. The tackle pulley 80 may also be replaced simply by a fixed guide surface, on which the upper line may glide. The diameter of the second wheel 54 is preferably smaller than that of the first wheel 50 or, alternatively, the circumference of the first guide surface 56 is smaller than that of the fourth guide surface 52, whereby transmission of the drive line drawing applied to the blade 18 may be changed in order to improve the cutting motion. Noteworthy is also that the guide surfaces 52, 56, 74 and 76 need not be round but they may also be oval or have some other suitable shape. In addition, the guide surfaces 74, 76 may have a specific size or they may be arches, circular arches or have other similar shapes, in which case the upper line 66, 68, 70 may be taken over these guide surfaces. In this context, the term line refers to a band, line, yarn, wire, chain, belt or other similar longitudinal drawing means.

FIGS. 4 and 5 show perspective views of an embodiment of the pruning shears 10 of the present invention from opposite sides, comprising the drive mechanism 16 of FIG. 3. These pruning shears substantially correspond to the pruning shears 10 according to FIGS. 1 and 2. Thus, the handle 14 is provided with the first counterpart 32, which is connected to the second counterpart 34, which is provided at the cutting head 12. The counterparts 32 and 34 are partly within each other and connected to one another by the axis 36 in such a manner that they are rotatable with respect to one another, in which case also the cutting head 12 and the handle 14 are rotatable relative to one another. Inside the drive mechanism 16, the first wheel 50 comprising the fourth guide surface 52 on its outer circumference is mounted on the axis 36. The first wheel 50 is also provided with the second wheel 54 coaxially, the diameter of which is smaller than that of the first wheel 50 and which comprises the first guide surface 56. The first and the second wheel 50 and 54 are arranged to rotate together about the axis 36.

According to FIG. 4, the cutting head 12 is provided with the tackle pulley 80 which is in a functional connection with the blade 18 and arranged to rotate about the axis 82. The tackle pulley 80 is connected to the blade 18 by a bar 84 at a hinge point 85 in such a manner that a linear motion of the tackle pulley 80 makes the blade 18 turn with respect to the counter blade 20 about the hinge point 19, at which the blade 18 is connected to the counter blade 20. FIG. 5 also shows that the first counterpart 32 is provided with the third wheel 78, which is on the same axis 36 as the first and the second wheel 50 and 54. The third wheel 78 comprises the third guide surface 76 on its outer circumference. The third wheel 78 and the second wheel 54 preferably have the same outer circumference diameter. All guide surfaces 52, 56, 74, 76 may comprise a groove, which may also be threaded in order to receive one or more turns of the drive line and/or the upper line.

According to FIGS. 4 and 5, the drive mechanism 16 also comprises the drive line 60, 62 and the upper line 64, 66, 68, 70, 72, which in the embodiment of FIGS. 4 and 5 consist of one line. The drive line 60 is inserted into the first counterpart 32 and further wound on the guide surface 52 of the first wheel 50. From the fourth guide surface 52, the drive line is taken via a connection point, such as a groove, to the guide surface 56 of the second wheel 54. From the guide surface 56, the line that is now called upper line 64, 66 is taken around the guide surface 74 of the tackle pulley 80 and further onto the third guide surface of the third wheel 78. From the third guide surface, the end 72 of the upper line is taken to the fastening point 94, to which it is fastened.

As described above, when the drive line 60 is drawn in the embodiment of FIGS. 4 and 5, the drive line 62 starts to wind off the first wheel 50, whereby the first wheel rotates about the axis 36. In this case, also the second wheel 54 rotates with the first wheel 50 and some of the upper line 64 is wound on the first guide surface 56 of the second wheel 54. The winding of the upper line 64 on the first guide surface 56 applies a drawing to the tackle pulley 80, drawing the tackle pulley 80 towards the second wheel 54 when the upper line 64 is wound on the first guide surface 56. At the same time, the upper line 66, 68 glides over the guide surface 74 of the tackle pulley 80 and the tackle pulley 80 rotates about the axis 82. The tackle pulley 80 thus moves linearly towards the second wheel 54, turning the blade 18 relative to the counter blade 20 about the hinge point 19 and against the spring load of the spring 26 (FIG. 1). The jaw 22 formed by the blade 18 and the counter blade 20 is thus closed and the blade 18 performs a cutting motion. When the drive line 60 is released, the spring load of the spring 26 draws the blade 18 to its initial position and also the upper line 64, 66, 68 and the drive line return to their original positions.

When the cutting head 12 is adjusted with respect to the handle 14, the cutting head 12 is turned about the axis 36 with respect to the handle 14. Thus, the upper line 64, 66, 68, 70 is wound accordingly on the first guide surface 56 and off the third guide surface 76 or, accordingly, off the first guide surface 56 and on the third guide surface 76, depending on the direction in which the cutting head 12 is turned with respect to the elongated handle 14. Thus, an equal amount of upper line 64, 66, 68, 70 is wound off the first guide surface 56 as is wound on the third guide surface 76, or vice versa, whereby no drawing is applied to the tackle pulley 80 and the blade 18 remains in its place with respect to the counter blade 20 and the jaw 22 stays open. In this way, it is simple to perform the cutting with the pruning shears 10 and the adjustment of the cutting head 12 with respect to the handle 14 as entirely separate operations.

The above structure is advantageous in that the drive mechanism has a force balance, whereby the cutting head 12 adjustable with respect to the handle 14 need not be locked relative to the handle 14. This is because, as a result of the drive line drawing, the cutting head 12 does not tend to return to a straight position, because no turning force is applied to the cutting head 12 in this case. This is possible because the upper line is wound on the guide surfaces 56 and 76 or the wheels 54 and 78 in the opposite directions. Due to the tackle pulley 80 or the guide surface 74, the sections 66 and 68 of the upper line have equal forces and they pass in the opposite directions around the wheels 54 and 78 or guide surfaces 56 and 76 having the same diameters, whereby the torques thereof cancel each other out and the cutting head 12 does not tend to turn when the drive line is drawn. This feature of the drive mechanism is very advantageous, because it simplifies the drive mechanism as no separate locking means of the cutting head 12 are required.

It is to be understood that the above description relates to a preferred embodiment of the present invention by way of example and that the invention is not restricted to the described exact forms. For example, even though the invention is explained with reference to an apparatus, which is presented in the form of pruning shears, it may also be used in other products. The drive wheel and the chain wheel may have a different configuration, which still maintains their essential function, which was described above. However, it is to be understood that these and other replacements, variations and changes may be made to the shape and order of the elements described herein without deviating from the appended claims.

The invention claimed is:

1. Pruning shears comprising:
    a cutting head with a spring-loaded blade connected to a counter blade pivotally about a hinge point, the counter blade acting in cooperation with the spring-loaded blade for cutting a workpiece received in a jaw provided by the counter blade,
    a drive mechanism connected to the cutting head,
    an elongated handle connected to the drive mechanism, which comprises a first counterpart and a second counterpart, optionally rotating with respect to each other about an axis, allowing the cutting head to be adjusted with respect to the elongated handle, whereby the first counterpart is connected to the elongated handle and the second counterpart is connected to the cutting head,
    a first wheel rotating about the axis,
    a drive line arranged to rotate the first wheel when the drive line is drawn,
    wherein the drive mechanism also comprises:
    a second wheel which comprises a first guide surface and is rotatable about the axis together with the first wheel,
    a second guide surface in functional connection with the spring-loaded blade,
    a third guide surface provided at the first counterpart or the handle,
    an upper line arrangement comprising an upper line connected via the second guide surface between the first guide surface and the third guide surface in such a manner that the upper line is arranged to be wound on the first guide surface when the second wheel rotates about the axis to turn the spring-loaded blade about the hinge point, and to be wound accordingly on the first guide surface and off the third guide surface or to be wound accordingly off the first guide surface and on the third guide surface when the cutting head is adjusted relative to the elongated handle.

2. Pruning shears as claimed in claim 1, wherein the first wheel comprises a fourth guide surface with a groove, which is arranged to receive one or more turns of the drive line around the fourth guide surface.

3. Pruning shears as claimed in claim 2, wherein the fourth guide surface comprises a threaded groove for receiving one or more turns of the drive line.

4. Pruning shears as claimed in claim 1, wherein the first wheel comprises a first fastening point for fastening the drive line to the first wheel.

5. Pruning shears as claimed in claim 1, wherein the second wheel is fixed to the first wheel so that the first wheel and the second wheel rotate together, or that the second wheel is an integral part of the first wheel.

6. Pruning shears as claimed in claim 1, wherein the first guide surface of the second wheel is arranged to receive one or more turns of the upper line.

7. Pruning shears as claimed in claim 1, wherein the upper line is fastened to a second fastening point provided at the first or the second wheel.

8. Pruning shears as claimed in claim 1, wherein the diameter of the second wheel is smaller than that of the first wheel.

9. Pruning shears as claimed in claim 1, wherein the second guide surface is provided in such a manner that the upper line is arranged to move over the second guide surface when the second wheel is rotated about the axis and the upper line is wound on the first guide surface.

10. Pruning shears as claimed in claim 1, wherein the second guide surface is provided by a tackle pulley, which is arranged to rotate about an axis.

11. Pruning shears as claimed in claim 1, wherein the third guide surface is provided at the first counterpart in such a manner that it turns with the first counterpart and the handle, when the cutting head is adjusted with respect to the handle.

12. Pruning shears as claimed in claim 1, wherein the third guide surface is formed at a third wheel which is provided at the first counterpart and arranged to turn together with the first counterpart.

13. Pruning shears as claimed in claim 12, wherein the third wheel and the second wheel are on the same axis, and that the shape and proportions of the third guide surface substantially correspond to those of the first guide surface.

14. Pruning shears as claimed in claim 1, wherein the first counterpart comprises a third fastening point, to which the upper line from the third guide surface is fastened.

15. Pruning shears as claimed in claim 1, wherein the upper line arrangement is implemented in such a manner that the upper line is arranged around at least part of the first guide surface and the third guide surface in such a manner that when the second wheel rotates about the axis, the upper line is wound on the first guide surface and stays in its place on the second guide surface, whereby the length of the upper line between the first guide surface and the third guide surface becomes shorter.

16. Pruning shears as claimed in claim 1, wherein the upper line arrangement is implemented in such a manner that the upper line is arranged around at least part of the first guide surface and the second guide surface in such a manner that when the cutting head is adjusted with respect to the handle, some of the upper line is wound accordingly on the first guide surface and off the third guide surface, or an equal amount of upper line is accordingly wound off the first guide surface as is wound on the third guide surface, whereby the length of the upper line between the first guide surface and the third guide surface stays the same.

17. Pruning shears as claimed in claim 1, wherein the drive line and the upper line form one uniform line.

18. A cutting tool comprising:
a cutting head with a blade coupled to a counter blade about a hinge point;
a drive mechanism coupled to the cutting head;
an elongated handle coupled to the drive mechanism;
a first counterpart coupled to the elongated handle;
a second counterpart coupled to the cutting head, the first and second counterparts rotatable with respect to each other about an axis, allowing the cutting head to be adjusted with respect to the elongated handle;
the drive mechanism further comprising:
a first wheel rotating about the axis;
a drive line arranged to rotate the first wheel when the drive line is drawn;
a second wheel which comprises a first guide surface and is rotatable about the axis together with the first wheel;
a second guide surface in functional connection with the blade;
a third guide surface provided at one of the first counterpart and the handle;
an upper line arrangement comprising an upper line connected via the second guide surface between the first guide surface and the third guide surface in such a manner that the upper line is arranged to be wound on the first guide surface when the second wheel rotates about the axis to turn the blade about the hinge point, and to be wound accordingly on the first guide surface and off the third guide surface or to be wound accordingly off the first guide surface and on the third guide surface when the cutting head is adjusted relative to the elongated handle.

19. A drive mechanism for a cutting tool having a handle and a cutting head with a movable blade, comprising:
a first wheel rotating about an axis;
a drive line arranged to rotate the first wheel when the drive line is drawn;
a second wheel having a first guide surface and is rotatable about the axis together with the first wheel;
a second guide surface in functional connection with the blade;
a third guide surface provided at the handle;
an upper line arrangement comprising an upper line connected via the second guide surface between the first guide surface and the third guide surface in such a manner that the upper line is arranged to be wound on the first guide surface when the second wheel rotates about the axis to move the blade, and to be wound accordingly on the first guide surface and off the third guide surface or to be wound accordingly off the first guide surface and on the third guide surface when the cutting head is adjusted relative to the handle.

* * * * *